United States Patent
Suematsu et al.

[11] Patent Number: 6,044,255
[45] Date of Patent: Mar. 28, 2000

[54] RADIO FREQUENCY CIRCUIT WITH INTEGRATED ELEMENTS AND METHOD OF MANUFACTURE

[75] Inventors: Noriharu Suematsu; Masayoshi Ono; Tadashi Kawahara; Mikio Uesugi; Kenji Hiroshige; Yoshitada Iyama, all of Tokyo, Japan

[73] Assignee: Mitsubishi Denki Kabushiki Kaisha, Tokyo, Japan

[21] Appl. No.: 08/939,968

[22] Filed: Sep. 29, 1997

[30] Foreign Application Priority Data

Mar. 26, 1997 [JP] Japan .................................... 9-073466

[51] Int. Cl.[7] .................................................. H04B 1/28
[52] U.S. Cl. ......................... 455/333; 330/300; 455/323
[58] Field of Search ..................................... 455/323, 326, 455/330, 333; 327/432, 433; 330/311, 300, 294; 257/627, 773, 194

[56] References Cited

U.S. PATENT DOCUMENTS

| | | |
|---|---|---|
| 3,974,455 | 8/1976 | Kamimura et al. . |
| 4,320,530 | 3/1982 | Ikeda ..................................... 455/182.1 |
| 4,535,304 | 8/1985 | Bura ........................................ 330/300 |
| 4,754,233 | 6/1988 | Pickett ..................................... 330/311 |
| 4,774,478 | 9/1988 | Taylor ...................................... 330/294 |
| 5,181,087 | 1/1993 | Usagawa et al. ........................ 257/194 |
| 5,373,191 | 12/1994 | Usagawa et al. ........................ 257/773 |
| 5,567,961 | 10/1996 | Usagawa et al. ........................ 257/197 |
| 5,663,570 | 9/1997 | Reedy et al. ................................. 257/9 |
| 5,668,402 | 9/1997 | Mochizuki et al. ..................... 257/627 |
| 5,841,300 | 11/1998 | Murabayashi et al. ................... 326/98 |
| 5,859,559 | 1/1999 | Hong et al. .............................. 327/359 |

OTHER PUBLICATIONS

The Institute of Electronics, Information and Communication Engineers (IEICE) "Technical Report"; MW 96–72; 1996; pp. 27–33.

*Primary Examiner*—William G. Trost

[57] ABSTRACT

A radio frequency circuit is disclosed which includes a low-noise amplifier and a mixer integrated on the same semiconductor chip by using a silicon BiCMOS process. The low-noise amplifier has a silicon bipolar junction transistor and the mixer has a silicon MOS type field effect transistor. In the radio frequency circuit, the mixer can include two silicon MOS type field effect transistors one of which has a source connected to a drain of the other silicon MOS type field effect transistor and a gate of one silicon MOS type field effect transistor is supplied with a local signal and a gate of the other silicon MOS type field effect transistor is supplied with a radio frequency signal amplified by the low-noise amplifier.

10 Claims, 11 Drawing Sheets

RADIO FREQUENCY CIRCUIT WITH INTEGRATED ELEMENTS AND METHOD OF MANUFACTURE

BACKGROUND OF THE INVENTION

The present invention relates to a radio frequency (RF) circuit having a function capable of amplifying a signal in an RF range, such as UHF waves, microwaves or milliwaves or converting the frequency of the same.

FIG. 15 is a block diagram showing a conventional RF circuit disclosed in, for example, The Institute of Electronics, Information and Communication Engineers (IEICE) Technical Report, MW 96-72, pp. 27–33, 1996, and composed of multi-stage amplifiers and a mixer. Referring to the drawing, reference numeral 1 represents an input terminal (IN), 2 represents an output terminal (OUT), 3 represents an input terminal (RF IN) for receiving an RF signal, 4 represents an input terminal (LO IN) for receiving a local signal, 5 represents an output terminal (IF OUT) for outputting an intermediate-frequency signal, 14a and 14b represent BJT amplifiers each of which is composed of a silicon bipolar junction transistor (hereinafter called as a "BJT"), 15 represents a mixer having the silicon BJT and 20 represents a silicon semiconductor chip on which two BJT amplifiers 14a and 14b and the mixer 15 are integrated.

The operation will now be described. The RF signal received by an antenna or the like is supplied to the input terminal 1, amplified by the BJT amplifier 14a, and then amplified by the BJT amplifier 14b. The signal is output from the output terminal 2. The amplified RF signal output from the output terminal 2 is allowed to pass through the input terminal (RF IN) 3 for receiving an RF signal, and then supplied to the mixer 15. Since the local signal has been supplied to the mixer 15 through the input terminal 4 (LO IN) for receiving the local signal, an intermediate-frequency signal having a differential frequency component between the two signals is generated in the mixer 15, and then output from the output terminal (IF OUT) 5 for outputting the intermediate-frequency signal.

When all of the plural stage amplifiers are the same type BJT amplifiers 14a and 14b, distortions, such as intermodulation distortions, become excessive though noise factors (NF) and gains can be improved. As a result, there arises a problem in that the foregoing structure is not suitable for use in, for example, a mobile communication receiving system which requires a low distortion characteristic.

Although a field effect transistor (hereinafter called as an "FET") of a MOS type or the like manufactured by the same silicon process has an excellent distortion characteristic, it involves a high noise factor and a low gain. Therefore, the foregoing transistor is not suitable for use as the low-noise amplifier as compared with the BJT. When the BJT is considered as a large output amplifier, the BJT having a large gain and involving excessive distortion encounters a problem in that it is not suitable for use as a linear amplifier which must have a low distortion characteristic. Since each MOSFET has a low gain, the number is increased when the same gain is required, thus resulting in a problem to arise in that the electric power consumption is enlarged and thus the size of the circuit is enlarged excessively. Note that the detailed structure of the circuit in the amplifier is disclosed in the cited document.

FIG. 16 shows the detailed structure of a circuit in the mixer 15 disclosed in The Institute of Electronics, Information and Communication Engineers (IEICE) Technical Report, MW 96-72, pp. 27–33, 1996, Department for the Study of Microwave of Electronic Information Communication Society, 1996 and shown in FIG. 15. Referring to the drawing, reference numerals 6a to 6c represent power supply terminals, 31a and 31b represent silicon BJTs and 34a to 34c represent resistors. The two BJTs 31a and 31b are connected in series, that is, the emitter of the silicon BJT 31b is connected to the collector of the other silicon BJT 31a. The RF signal is received by the base of the silicon BJT 31a through the input terminal (RF IN) 3, while the local signal is received by the base of the silicon BJT 31b through the input terminal (LO IN) 4. The intermediate-frequency signal having a different frequency component between the RF signal and the local signal is fetched from the collector of the silicon BJT 31b, and then output through the output terminal (IF OUT) 5. The resistors 34a to 34c are bias resistors for supplying DC power source from the power supply terminals 6a to 6c to the two silicon BJTs 31a and 31b.

Although the BJT has a characteristic in that the noise factor (NF) is low and the gain is high as compared with the MOSFET manufactured by the same process, it has a problem in that it can easily be saturated and has large distortion. If the intermediate-frequency signal or a base band signal is supplied in place of the RF signal, the BJT as well as acts as a transmitting mixer.

Since the BJT amplifiers 14a and 14b and the mixer 15 composed of the two silicon BJTs 31a and 31b can be manufactured by the same silicon semiconductor process, they can be monolithically integrated on one silicon semiconductor chip 20, as shown in FIG. 15. If larger mixer local electric power is required, the local amplifier generally comprises the BJT and is monolithically integrated on the same silicon semiconductor chip 20 having the mixer and the like monolithically integrated thereon.

The conventional RF circuit fabricated as described above such that all of the plural stage amplifiers are the same type transistors however suffers from high distortion though an excellent noise factor (NF) can be realized if the RF circuit comprises the same type BJTs as the low-noise amplifier. Therefore, there arises a problem in that the foregoing RF circuit is not suitable for use as a receiving system which must satisfy both of the low noise characteristic and the small distortion characteristic. If a large output amplifier comprising the BJT is fabricated, the amplifier of the foregoing type is not suitable for use as a linear amplifier which must have a low distortion characteristic because of the large distortion though a large gain can be realized.

Although an RF circuit of the type composed of a mixer comprising only the BJTs is able to obtain a large conversion gain, there arises a problem in that the RF circuit of this type is not suitable for use as a receiving mixer which must have a low distortion characteristic because of too large distortion. Another problem arises in that it is not suitable for use as a transmitting mixer.

An RF circuit of the type in which the amplifier and the mixer are monolithically integrated on one chip has the structure such that all of the RF semiconductor devices are the BJTs. Therefore, there arises a problem in that the RF circuit of the foregoing type is not suitable for use as an RF circuit which must satisfy both of the low noise characteristic and a small distortion characteristic.

Although the mixer having the structure in which the BJT is employed as the local amplifier is able to operate with small local electric power, it suffers from a problem in that the noise of the mixer is intensified because the local amplifier can easily be saturated and noise is added to the local signal.

SUMMARY OF THE INVENTION

Accordingly, an object of the present invention is to provide an RF circuit capable of overcoming the above-mentioned problems and preventing distortion.

To achieve the above-mentioned object, according to one aspect of the present invention, there is provided an RF circuit comprising plural stage-amplifiers, wherein at least a first amplifier is a BJT amplifier having a junction type bipolar transistor and at least a final amplifier is an FET amplifier having a field effect transistor.

In particular, the present invention is fabricated such that the junction type bipolar transistor is a silicon bipolar junction transistor, the field effect transistor is a silicon MOS type field effect transistor, and the transistors are integrated on the same silicon semiconductor chip by using a silicon BiCMOS process.

Moreover, the structure is formed such that the junction type bipolar transistor is a GaAs hetero junction bipolar transistor, the field effect transistor is a GaAs field effect transistor, and the transistors are integrated on the same GaAs semiconductor chip.

According to another aspect of the present invention, there is provided an RF circuit comprising a low-noise amplifier and a mixer monolithically integrated on the same semiconductor chip by using a silicon BiCMOS process, wherein the low-noise amplifier has a silicon bipolar junction transistor, and the mixer has a silicon MOS type field effect transistor.

In the present invention, the mixer is composed of two silicon MOS type field effect transistors one of which has a source connected to the drain of another silicon MOS type field effect transistor, and the gate of one of the silicon MOS type field effect transistors is supplied with a local signal, and the gate of the other silicon MOS type field effect transistor is supplied with an RF signal amplified by the low-noise amplifier.

In the present invention, the mixer is composed of a silicon dual-gate MOS type field effect transistor, a local signal is supplied to one of the gates, and an RF signal amplified by the low-noise amplifier is supplied to another gate.

In the present invention, the low-noise amplifier is fabricated such that at least a first amplifier is a BJT amplifier having a silicon bipolar junction transistor, at least a final amplifier is an FET amplifier having a silicon MOS type field effect transistor, and the amplifiers are integrated on the same silicon semiconductor chip by using a silicon BiCMOS process.

According to another aspect of the present invention, there is provided an RF circuit comprising a mixer composed of two field effect transistors connected in series and fabricated such that a local signal is supplied to the gate of one of the field effect transistors, and a signal, the frequency of which is converted, is supplied to the gate of the other field effect transistor, wherein the width of the field effect transistor, to which the local signal is supplied, is reduced as compared with the width of the gate of the field effect transistor to which the signal, the frequency of which is converted, is supplied.

According to another aspect of the present invention, there is provided an RF circuit comprising a mixer composed of a junction type bipolar transistor, and a field effect transistor connected in series, wherein a local signal is supplied to the base of the junction type bipolar transistor and a signal, the frequency of which is converted, is supplied to the gate of the field effect transistor.

In these inventions, the junction type bipolar transistor is a silicon bipolar junction transistor, the field effect transistor is a silicon MOS type field effect transistor, and the transistors are integrated on the same silicon semiconductor chip by using a silicon biCMOS process.

The structure of the present invention further comprises a low-noise amplifier fabricated such that at least a first amplifier is a BJT amplifier having a silicon bipolar junction transistor, at least a final amplifier is an FET amplifier having a silicon MOS field effect transistor, and the low-noise amplifier, and the mixer are fabricated on the same semiconductor chip by using a biCMOS process.

According to another aspect of the present invention, there is provided an RF circuit comprising a local amplifier, and a mixer having a junction type bipolar transistor, and which are formed on the same semiconductor chip by using a biCMOS process, wherein the local amplifier has a silicon MOSFET.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

First Embodiment

Figure 1:
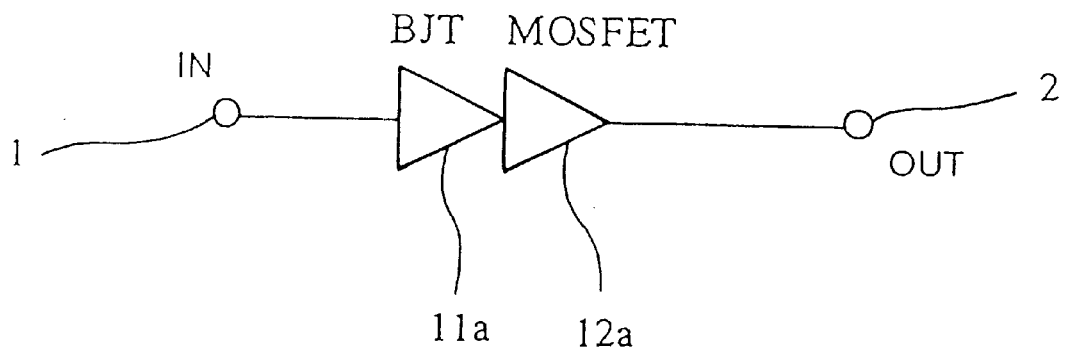
FIG. 1 is a block diagram showing the structure of an embodiment of an RF circuit according to a first embodiment of the present invention.

FIG. 1 is a block diagram showing a first embodiment of an RF circuit according to the present invention. Referring to the drawing, reference numeral 1 represents an input terminal (IN), 2 represents an output terminal (OUT), 11a represents a BJT amplifier comprising a BJT and 12a represents a MOSFET amplifier comprising a MOSFET. The MOSFET amplifier 12a and the BJT amplifier 11a form a two-stage amplifier. Note that both of the BJT amplifier 11a and the MOSFET amplifier 12a are silicon semiconductor devices.

The operation will now be described. An RF signal is supplied to the input terminal 1, and then amplified by the BJT amplifier 11a. Then, it is amplified by the MOSFET amplifier 12a, and then output through the output terminal 2.

The BJT amplifier 11a involves low noise and large gain and distortion. On the other hand, the MOSFET amplifier 12a involves low distortion, a small gain and high noise.

Therefore, in a case where the RF circuit according to the first embodiment is used as a low-noise amplifier, a low noise characteristic can be obtained because the BJT amplifier which mainly affects the noise characteristic is used as the first amplifier. Moreover, use of the MOSFET amplifier, which mainly affects the distortion characteristic, as the final amplifier attains small distortion. As a result, an RF circuit having a low noise characteristic and small distortion characteristic can be obtained.

Although the BJT for forming the BJT amplifier 11a and the FET for forming the MOSFET amplifier 12a are not limited in the first embodiment, the BJT and FET may be made of silicon or a compound semiconductor, such as SiGe, GaAs or InP. The BJT may be a pn junction BJT or hetero junction BJT (HBT). Although the description has been performed about the structure in which the MOSFET is employed as the FET, a similar effect can be obtained if the FET is the MOSFET, a MODFET (Modulation all doped FET), a HEMT (high electron mobility transistor) or the like. The BJT and the FET may be formed on individual semiconductor chips.

Although the first embodiment has been described about the two amplifiers, three or more amplifiers may be employed in the above-mentioned structure, that is, the first amplifier is the BJT amplifier and the final amplifier is the MOSFET amplifier. In this case, a similar effect to that obtainable from the foregoing structure can be obtained.

That is, in a case of the three amplifiers, a structure having the BJT amplifier as the second amplifier enables further low noise and large gain characteristics to be obtained. If the second amplifier is the MOSFET amplifier, a lower distortion characteristic can be obtained.

Figure 2:
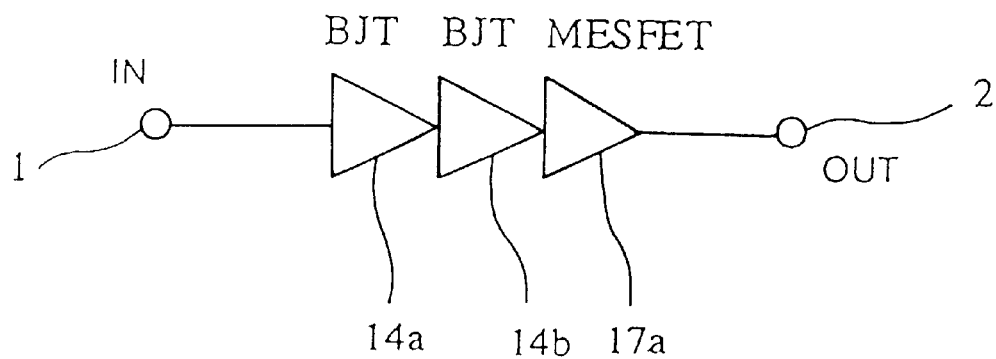
FIG. 2 is a block diagram showing the structure formed when three amplifiers are formed in the first embodiment of the RF circuit according to the present invention.

FIG. 2 is a block diagram showing a structure provided with three amplifiers. Referring to the drawing, reference numerals 14a and 14b represent silicon BJT amplifiers and 17a represents a GaAs MOSFET amplifier 17a. As the first and second amplifiers, the silicon BJT amplifiers each involving large distortion and requiring a low cost are employed. Moreover, the GaAs MOSFET (Metal semiconductor FET) free from large distortion and requiring a high cost is employed as the final amplifier. Therefore, an amplifier involving small distortion and exhibiting a low-cost can be obtained. The foregoing structure is effective as a large output amplifier. That is, an amplifier can be obtained which is capable of reducing distortion in the output therefrom because the structure shown in FIG. 2 is formed such that the final amplifier is the FET amplifier 17a and capable of realizing a large gain and exhibiting a low cost because the first and second amplifiers are the BJT amplifiers.

Second Embodiment

Figure 3:
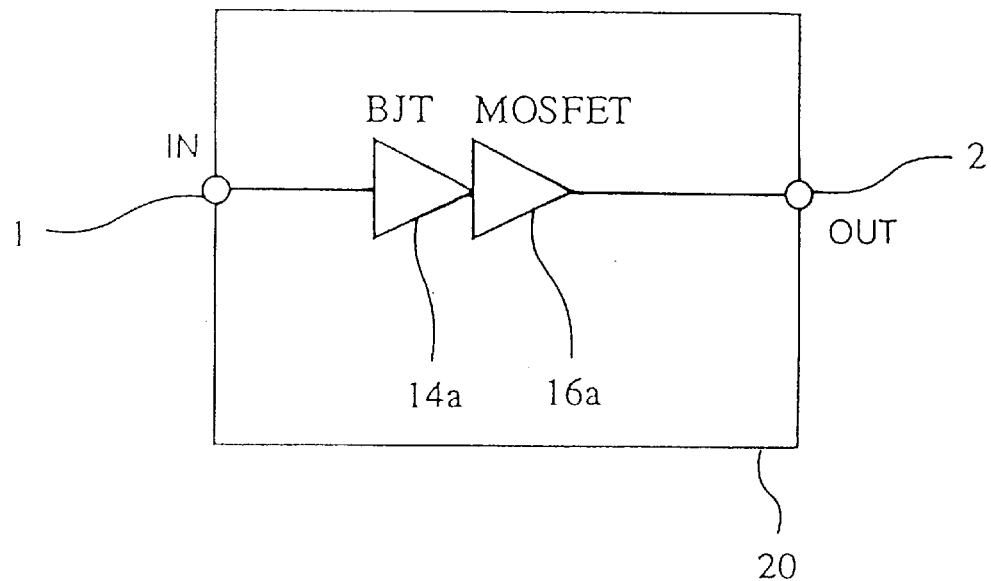
FIG. 3 is a block diagram showing the structure of a second embodiment of the RF circuit according to the present invention.

FIG. 3 is a block diagram showing a second embodiment of the RF circuit according to the present invention. Referring to the drawing, reference numeral 1 represents an input terminal (IN), 2 represents an output terminal (OUT), 14a represents a silicon BJT amplifier comprising silicon BJT, 16a represents a silicon MOSFET amplifier comprising a silicon MOSFET and 20 represents a silicon semiconductor chip.

The structure and operation are basically similar to those of the first embodiment. Moreover, the second embodiment has a structure such that the silicon BJT amplifier 14a and the silicon MOSFET amplifier 16a are monolithically integrated on the same silicon semiconductor chip 20 because both of the silicon BJT amplifier 14a and the silicon MOSFET amplifier 16a can be formed by a silicon biCMOS process.

Therefore, the structure according to the second embodiment, having the structure similar to that according to the first embodiment such that the BJT amplifier is employed as the first amplifier and the FET amplifier is employed as the final amplifier, enables an RF circuit having both a low noise characteristic and a low distortion characteristic to be obtained. Since a multiamplifier comprising the silicon BJT amplifier 14a and the silicon MOSFET amplifier 16a can be integrally formed on the same silicon semiconductor chip 20, the size of the circuit can be reduced.

When an enhancement mode n-type MOSFET is employed as the silicon MOSFET amplifier 16a, the amplifier is operated with only positive voltage and the large gain can be obtained with a high frequency. As a result, the structure of the amplifier according to this embodiment is effective as a low noise amplifier and as a large output amplifier.

Third Embodiment

Figure 4:
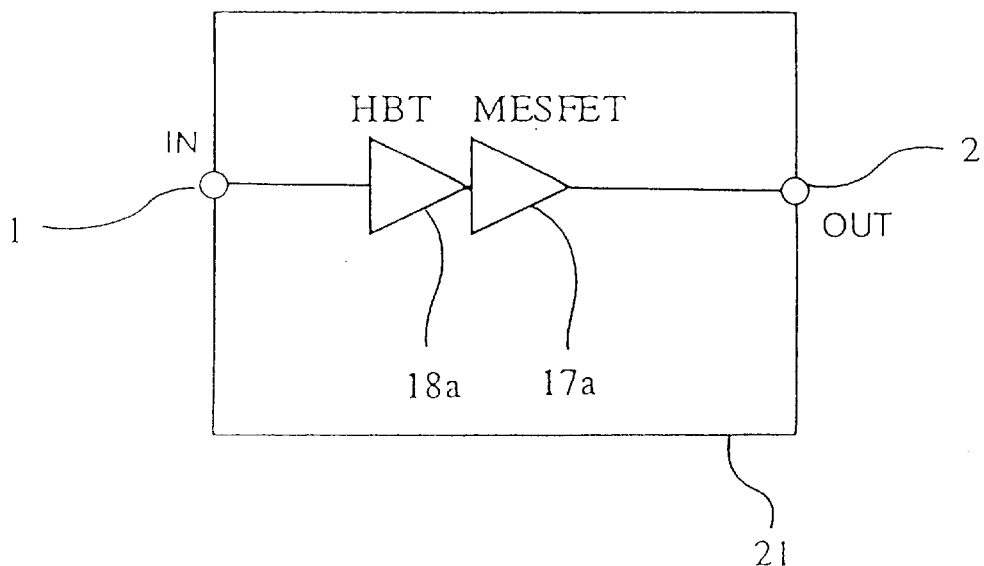
FIG. 4 is a block diagram showing the structure of a third embodiment of the RF circuit according to the present invention.

FIG. 4 is a block diagram showing a third embodiment of the RF circuit according to the present invention. Referring to the drawing, reference numeral 1 represents an input terminal (IN), 2 represents an output terminal (OUT), 17a represents a GaAs MOSFET amplifier comprising a GaAs MOSFET, 18a represents a GaAs HBT amplifier comprising a GaAs HBT and 21 represents a GaAs semiconductor chip.

The structure and operation are basically similar to those according to the second embodiment. The GaAs HBT amplifier 18*a* is substituted for the silicon BJT amplifier 14*a* and the GaAs MOSFET amplifier 17*a* is substituted for the silicon MOSFET amplifier 16*a*.

Since the third embodiment enables both of the GaAs MOSFET amplifier 17*a* and the GaAs HBT amplifier 18*a* to simultaneously be formed by a GaAs process, they are integrally formed on the same GaAs semiconductor chip 21.

Therefore, the third embodiment, fabricated similarly to the first embodiment such that the BJT amplifier is employed as the first amplifier and the FET amplifier is employed as the final amplifier, enables an RF circuit having a low noise characteristic and a small distortion characteristic to be obtained. Moreover, since a multiamplifier comprising the GaAs MOSFET amplifier 17*a* and the GaAs HBT amplifier 18*a* can be integrally formed on the same GaAs semiconductor chip 21, the size of the circuit can be reduced.

Note that use of an HFET, MODFET or HEMT in place of GaAs MESFET 17*a* attains a similar effect.

Fourth Embodiment

Figure 5:
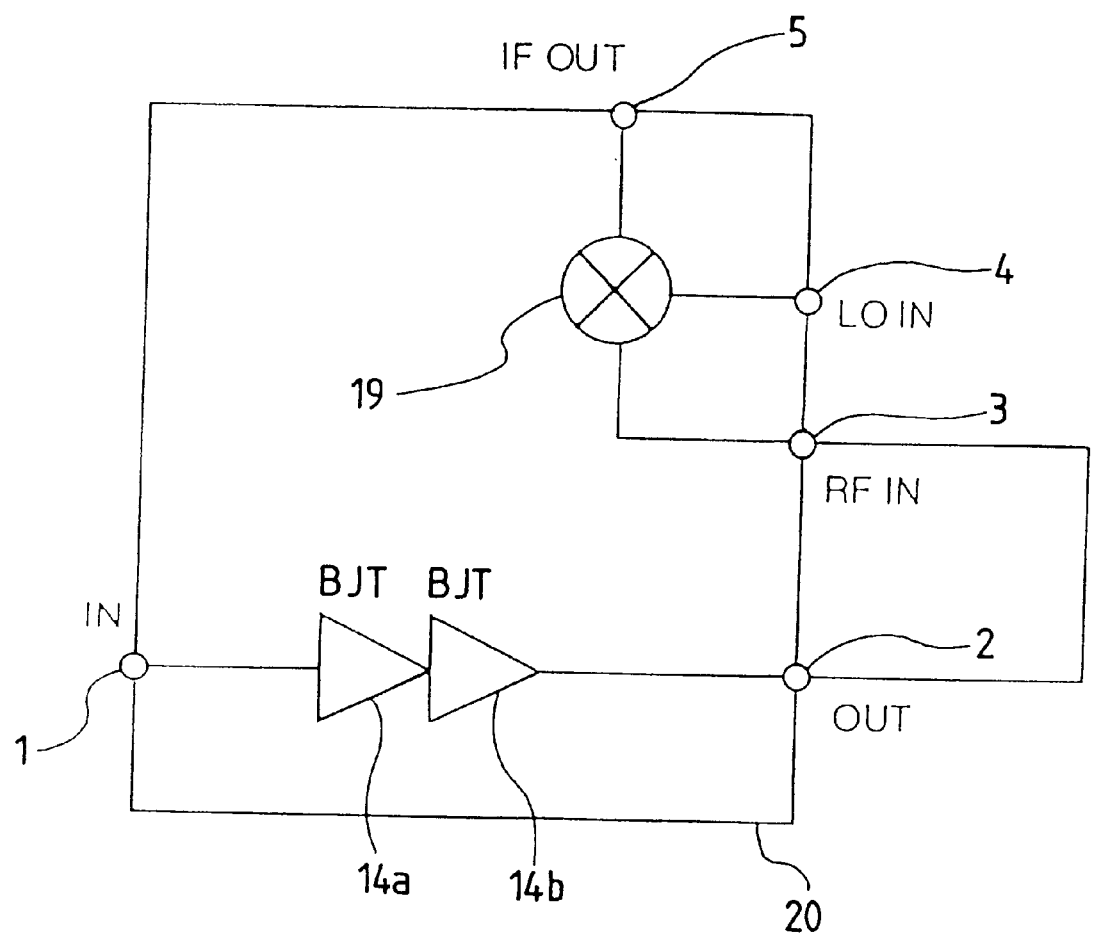
FIG. 5 is a block diagram showing the structure of a fourth embodiment of the RF circuit according to the present invention.

FIG. 5 is a block diagram showing a fourth embodiment of the RF circuit according to the present invention. Referring to the drawing, reference numeral 1 represents an input terminal (IN), 2 represents an output terminal (OUT), 3 represents an input terminal (RF IN) for receiving an RF signal, 4 represents an input terminal (LO IN) for receiving a local signal, 5 represents an output terminal (IF OUT) for outputting an intermediate-frequency signal, 14*a* and 14*b* represent silicon BJT amplifiers; 19 represents a mixer comprising a silicon NMOSFET and 20 represents a silicon semiconductor chip having the two amplifiers 14*a* and 14*b* and the mixer 19.

Figure 6:
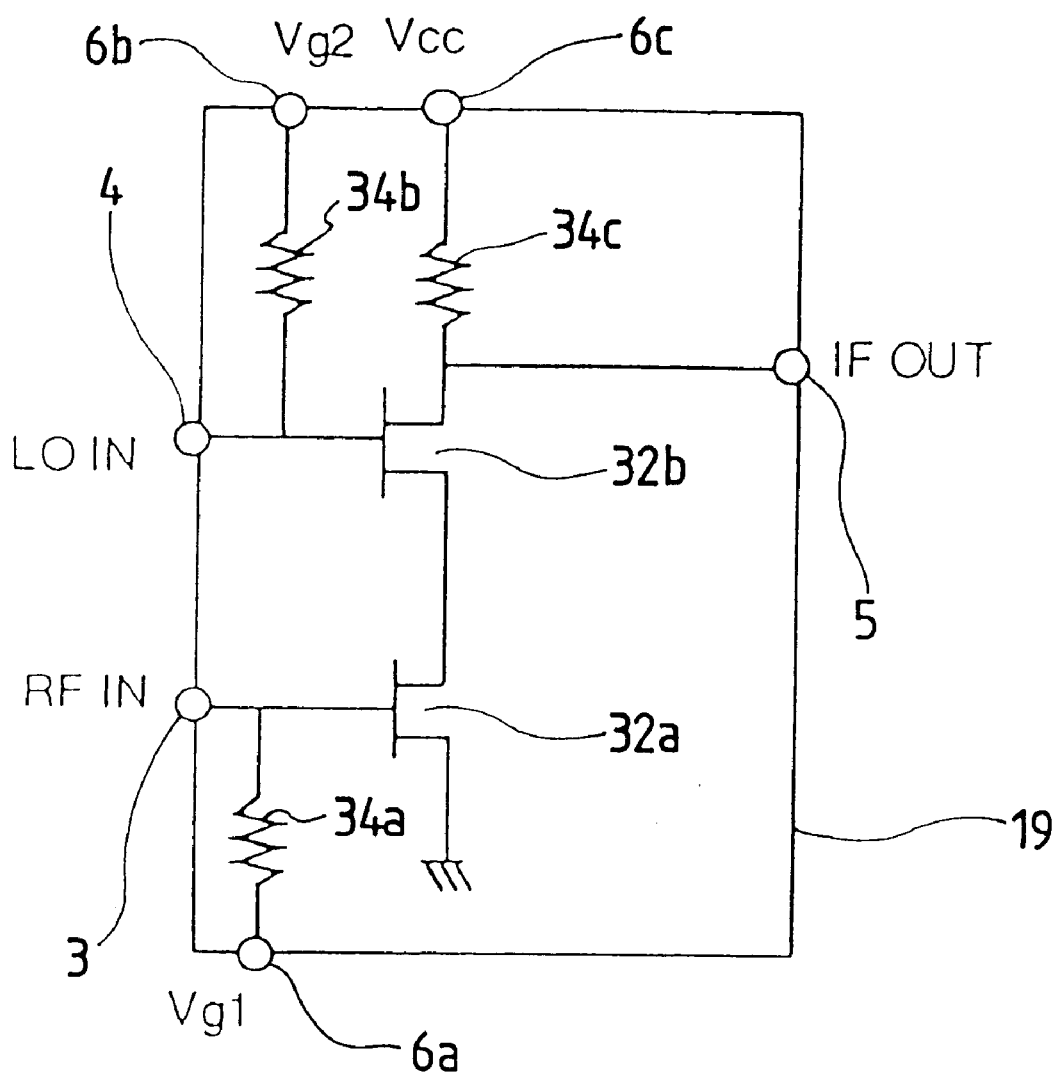
FIG. 6 is a circuit diagram showing the detailed structure of the mixer 19 shown in FIG. 5.

FIG. 6 shows the detailed structure of a circuit in the mixer 19 shown in FIG. 5. Referring to the drawing, reference numeral 3 represents an input terminal (RF IN) for receiving an RF signal, 4 represents an input terminal (LO IN) for receiving a local signal, 5 represents an output terminal (IF OUT) for outputting an intermediate-frequency signal, 6*a* to 6*c* represent power supply terminals, 32*a* and 32*b* represent silicon MOSFETs and 34*a* to 34*c* represent bias resistors for supplying DC electric power to the two MOSFETs 32*a* and 32*b* from the power supply terminals 6*a* to 6*c*.

The operation will now be described. As shown in FIG. 5, an RF signal received by an antenna or the like is supplied to the input terminal 1, amplified by the BJT amplifier 14*a*, amplified by the BJT amplifier 14*b*, and then output from the output terminal 2. The amplified RF output from the output terminal 2 is allowed to pass through the input terminal (RF IN) 3 for receiving the RF signal, and then supplied to the mixer 19. Since the mixer 19 has been supplied with the local signal through the input terminal (LO IN) 4 for receiving the local signal, an intermediate-frequency signal having a different frequency component between the two signals is generated by the mixer 19. The generated intermediate-frequency signal is output from-the output terminal (IF OUT) 5 for outputting the intermediate-frequency signal.

The operation of the mixer 19 will now be described. As shown in FIG. 6, the two MOSFETs 32*a* and 32*b* forming the mixer 19 are connected in series, as shown in FIG. 6. Thus, the RF signal is supplied to the gate of the MOSFET 32*a* through the input terminal (RF IN) 3, while the local signal is supplied to the gate of the MOSFET 32*b* through the input terminal (LO IN) 4. Therefore, the intermediate-frequency signal having a different frequency component between the RF and the local signal is fetched from the drain of the MOSFET 32*b*, and then output through the output terminal (IF OUT) 5.

Therefore, the fourth embodiment comprising the MOSFETs 32*a* and 32*b* as the linear devices of the mixer 19 enables a low distortion characteristic as compared with a mixing comprising a BJT to be obtained.

In a case where the RF circuit according to the fourth embodiment is employed as a receiving RF circuit, distortion of the mixer which processes high level RF signals can be reduced. Thus, a low distortion receiving system can be realized.

Since the mixer 19 according to the fourth embodiment comprises the MOSFETs 32*a* and 32*b*, high level noise is generated. However, a receiving system fabricated such that a large gain is provided for the low noise amplifier is able to reduce an influence of noise of the mixer on the noise of the do receiving system to a level which can be ignored. Therefore, any problem arises.

Figure 7:
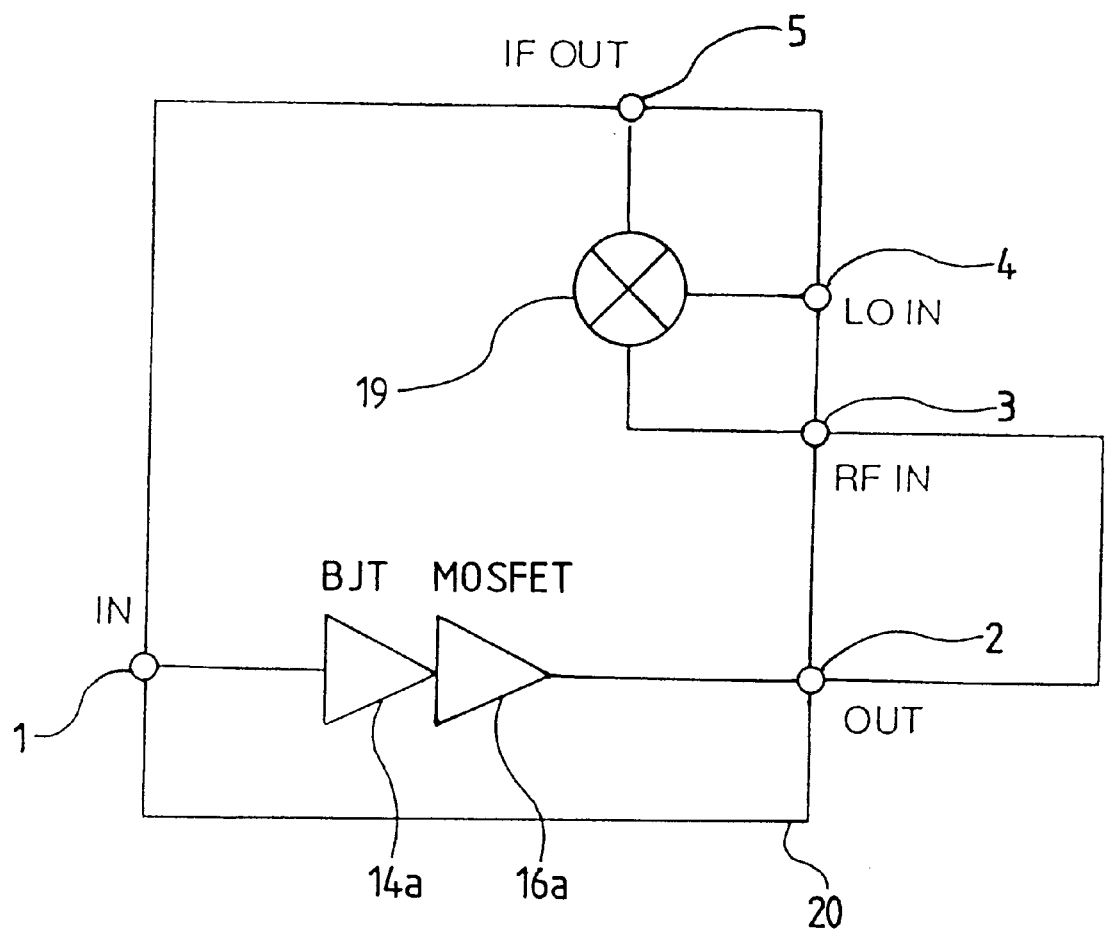
FIG. 7 is a block diagram showing another example of the structure of the fourth embodiment.

Although the fourth embodiment has been described about the structure in which the two silicon BJT amplifiers 14*a* and 14*b* are connected in series as shown in FIG. 5 to form the multiamplifier, the present invention is not limited to this. For example, the multiamplifier may, as shown in FIG. 7, have a structure corresponding to the structure according to the second embodiment, that is, the silicon BJT amplifier 14*a* is employed as the first amplifier and the silicon MOSFET amplifier 16*a* is employed as the second amplifier which is the final amplifier. The foregoing structure attains an effect to reduce distortion of a receiving system in a case of major distortion of the receiving system is caused form the multiamplifier.

Fifth Embodiment

A fifth embodiment is formed such that the structure of the mixer of the RF circuit according to the fourth embodiment is changed. The other structures and operations are the same as those of the foregoing embodiment. Therefore, only a mixer 19*a* according to the fifth embodiment will now be described.

Figure 8:
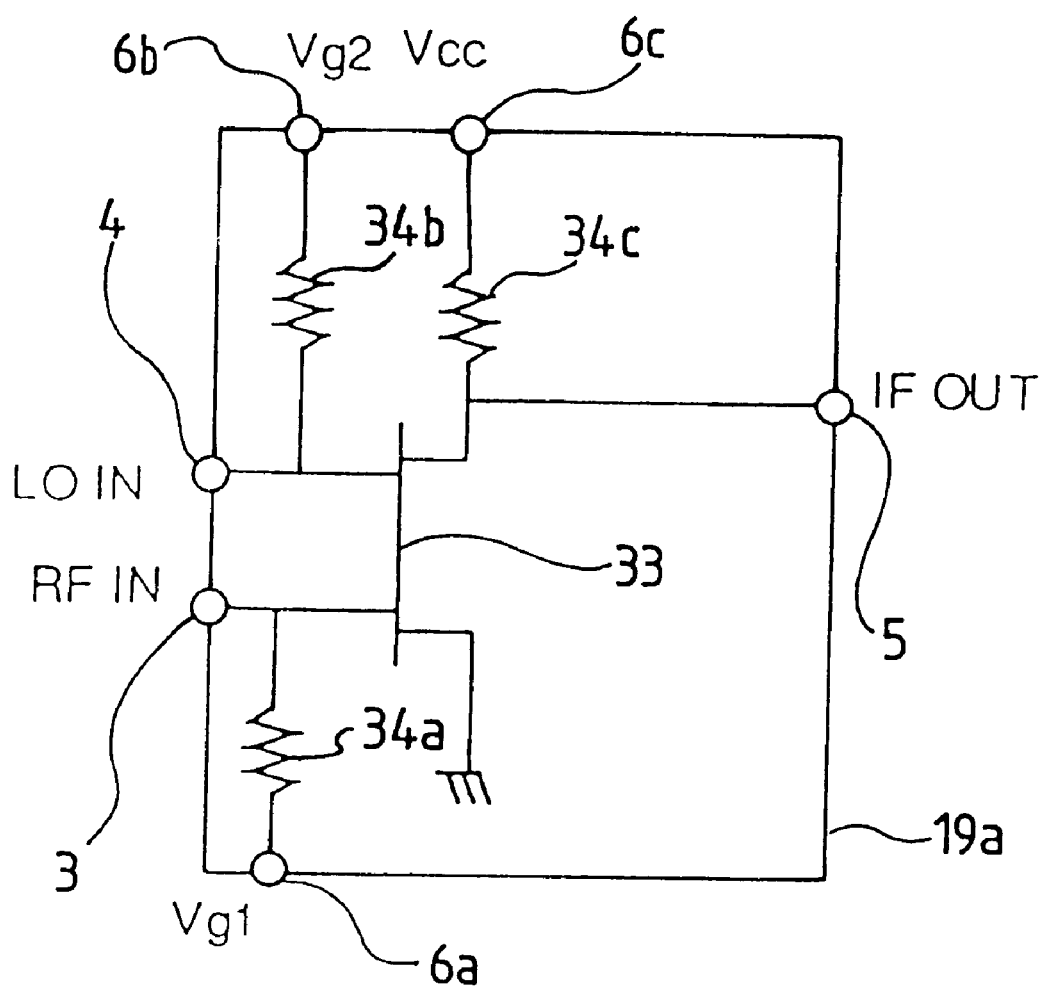
FIG. 8 is a circuit diagram showing the detailed structure of a mixer 19a in a fifth embodiment of the RF circuit according to the present invention.

FIG. 8 shows the detailed structure of a circuit in the mixer 19*a* of the RF circuit according to the fifth embodiment of the present invention. Referring to the drawing, reference numeral 3 represents an input terminal (RF IN) for receiving an RF signal, 4 represents an input terminal (LO IN) for receiving a local signal, 5 represents an output terminal (IF OUT) for toutputting an intermediate-frequency signal, 6*a* to 6*c* represent power supply terminals, 33 represents a silicon dual-gate MOSFET and 34*a* to 34*c* represent bias resistors for supplying DC electric power to the silicon dual-gate MOSFET 33 through the power supply terminals 6*a* to 6*c*.

The operation will now be described. The RF signal is supplied to one of gates of the silicon dual-gate MOSFET 33 through the input terminal (RF IN) 3, while the local signal is supplied to another gate of the silicon dual-gate MOSFET 33 through the input terminal (LO IN) 4.

The intermediate-frequency signal having a different frequency component between the RF signal and the local signal is fetched through the drain of the silicon dual-gate MOSFET 33, and then output through the output terminal (IF OUT) 5.

Therefore, the fifth embodiment fabricated such that the mixer 19*a* comprises the silicon dual-gate MOSFET 33 enables a low noise characteristic as compared with the mixer comprising the BJT though noise is high to be obtained.

Since the structure according to the fifth embodiment is formed such that only one silicon dual-gate MOSFET 33 is provided, the numbers of the drains and sources can be decreased as compared with the mixer 19 having the two MOSFETs 32*a* and 32*b* connected in series as shown in FIG. 6 and according to the fourth embodiment. Thus, the ohmic resistance components of their electrode portions can be reduced. As a result, the fifth embodiment is able to reduce noise and enlarge the gain as compared with the fourth embodiment.

Sixth Embodiment

Figure 9:
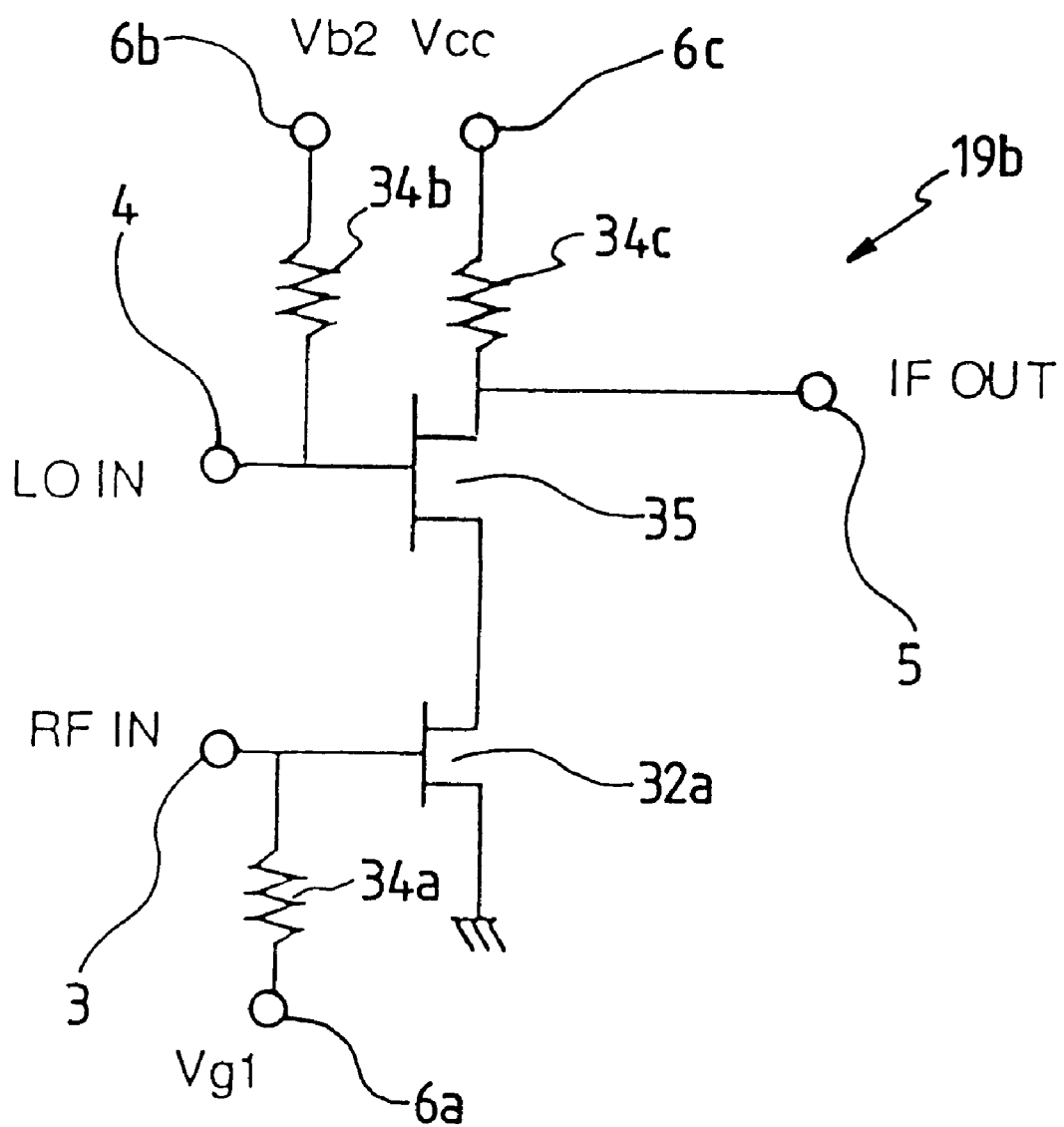
FIG. 9 is a circuit diagram showing the detailed structure of a mixer 19a which is a sixth embodiment of the RF circuit according to the present invention.

FIG. 9 shows the detailed structure of a circuit in a mixer 19*b* which is a sixth embodiment of the RF circuit according to the present invention. Referring to the drawing, reference numeral 32*a* represents a silicon MOSFET and 35 represents a silicon MOSFET comprising a gate having a width smaller than the width of the gate of the silicon MOSFET 32*a*. The silicon MOSFETs 32*a* and 35 are formed on different semiconductor chips. Since the other structures are the same as those of the mixer 19 shown in FIG. 6 and according to the fourth embodiment, the same structures are omitted from description.

Therefore, the sixth embodiment is formed such that the structure and operation of the 19*b* are basically similar to those of the mixer 19 shown in FIG. 6 and according to the fourth embodiment. However, only the width of each of the gates of the silicon MOSFETs 32*a* and 35 to each of which the local signal is supplied is different. Therefore, as compared with the structure in which the widths of the gates of the silicon MOSFETs 32*a* and 35 are the same, the gain can be enlarged if the electric currents and a DC bias condition for the voltage are the same though substantially the same distortion characteristics are realized. Thus, it can be operated with electric power level for the local signal.

Although the sixth embodiment has been described about the silicon MOSFETs 32*a* and 35, an FET having another structure, for example, a GaAs MESFET, an HFET, a HEMT or MODFET may be employed to obtain a similar effect.

Figure 10:
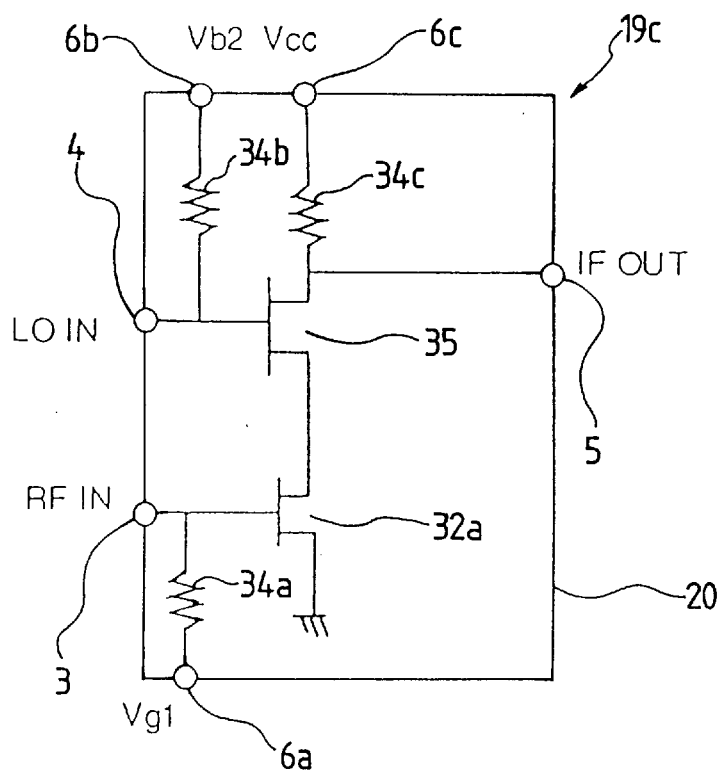
FIG. 10 is a circuit diagram showing another example of the mixer which is the sixth embodiment of the RF circuit according to the present invention.

Although the sixth embodiment has been described about the structure in which the two silicon MOSFETs 32*a* and 35 forming the mixer 19 are formed on the different semiconductor chips, a mixer 19*c* shown in FIG. 10 may be employed in which the two silicon MOSFETs 32*a* and 35 having different gate widths are formed on one silicon semiconductor chip 20 by using the silicon biCMOS process. The foregoing structure enables the small distortion mixer 19*c* to be integrally formed on one silicon semiconductor chip 20.

As shown in FIG. 7, a mixer comprising the silicon BJT amplifier 14*a* as the first amplifier and the silicon NOSFET amplifier 16*a* as the second amplifier which is the final amplifier may, of course, be employed in which a mixer 19*c* is formed such that the two silicon MOSFETs 32*a* and 35 having the different gate widths as shown in FIG. 10 are formed on one silicon semiconductor chip 20 by the silicon biCMOS process. If the foregoing structure is employed, an effect to reduce distortion of a receiving system can be obtained in a case of major distortion of the receiving system is caused from the multiamplifier.

Another structure may be employed in which an intermediate-frequency signal or a base band signal is supplied in place of the RF signal to act as a transmitting mixer. A similar effect can be obtained in this case.

Seventh Embodiment

Figure 11:
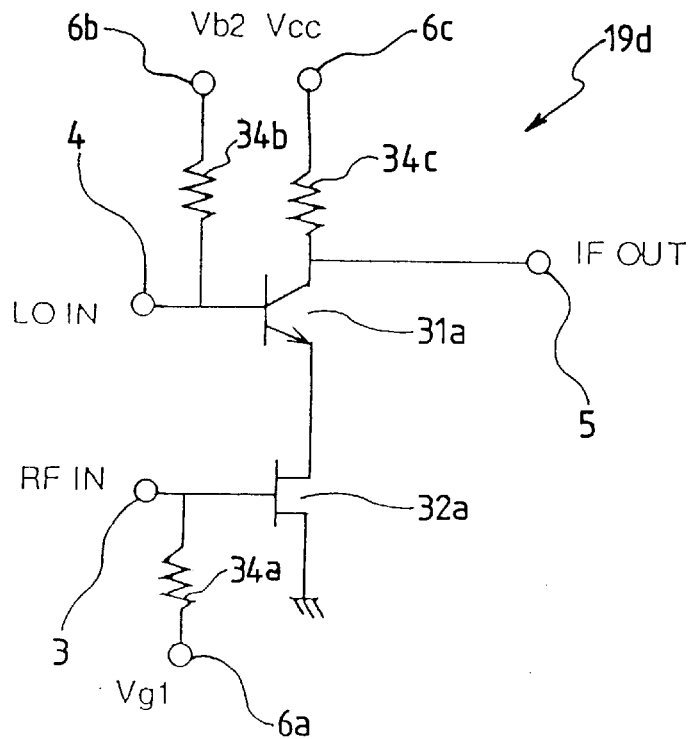
FIG. 11 is a circuit diagram showing the detailed structure of a mixer 19d which is a seventh embodiment of the RF circuit according to the present invention.

FIG. 11 shows the detailed structure of a circuit in a mixer 19*d* which is a seventh embodiment of the RF circuit according to the present invention. Referring to the drawing, reference numeral 31*a* represents a silicon BJT and 32*a* represents a silicon MOSFET. The silicon BJT 31*a* and the silicon MOSFET 32*a* are formed on different semiconductor chips. Note that resistors 34*a* to 34*c* are bias resistors for supplying DC electric power to the silicon BJT 31*a* and the silicon MOSFET 32*a* through the power supply terminals 6*a* to 6*c*. Since the other structures are the same as those shown in FIG. 6 and according to the fourth embodiment, the same structures are omitted from description.

The operation will now be described. In the seventh embodiment, the silicon BJT 31*a* and the MOSFET 32*a* are connected in series. Thus, the RF signal is supplied to the gate of the MOSFET 32*a* through the input terminal (RF IN) 3, while the local signal is supplied to the base of the silicon BJT 31*a*.

Therefore, the intermediate-frequency signal having a different frequency component between the RF signal and the local signal is fetched from the collector of the silicon BJT 31*a*, and then output through the output terminal (IF OUT) 5.

Therefore, the seventh embodiment, having the structure such that the mixer 19*d* has each of the silicon BJT 31*a* and the MOSFET 32*a*, enables a low noise characteristic to be obtained though the noise level is higher than that of the mixer formed by only the BJT. Moreover, the silicon BJT 31*a* to which the local signal is supplied has a high gain as compared with the structure in which two MOSFETs are connected in series. Therefore, it can be operated with a lower local signal power.

Although the description has been performed such that the MOSFET 32*a* is employed as the FET for forming the mixer 19*d*, an FET having another structure, for example, GaAs MESFET, an HFET, a HEMT or MODFET may be employed to obtain a similar effect.

Figure 12:
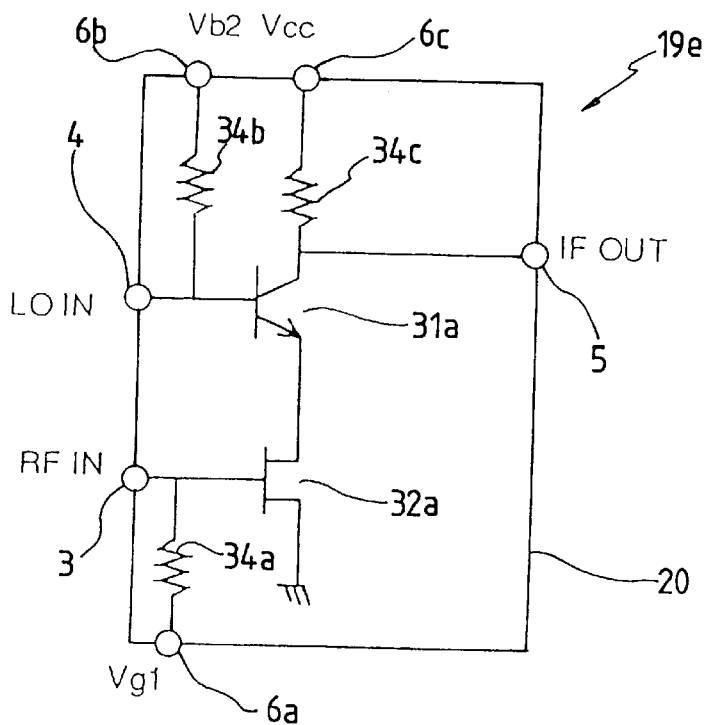
FIG. 12 is a circuit diagram showing another example of the mixer which is the seventh embodiment of the RF circuit according to the present invention.

Although the seventh embodiment has been described about the structure in which the silicon BJT 31*a* and the silicon MOSFET 32*a* forming the mixer 19*d* are formed on the different semiconductor chips, a mixer 19*e* may be employed in which the silicon BJT 31*a* and the silicon MOSFET 32*a* are formed on one silicon semiconductor chip 20 by using the silicon biCMOS process, as shown in FIG. 12. If the structure is formed as described above, the low noise mixer 19*d* may be integrally formed on the silicon semiconductor chip 20. Therefore, the size can be reduced. When When an intermediate-frequency signal or a base band signal is supplied in place of the RF signal to cause the structure to act as a transmitting mixer, a similar effect can be obtained.

Eighth Embodiment

Figure 13:
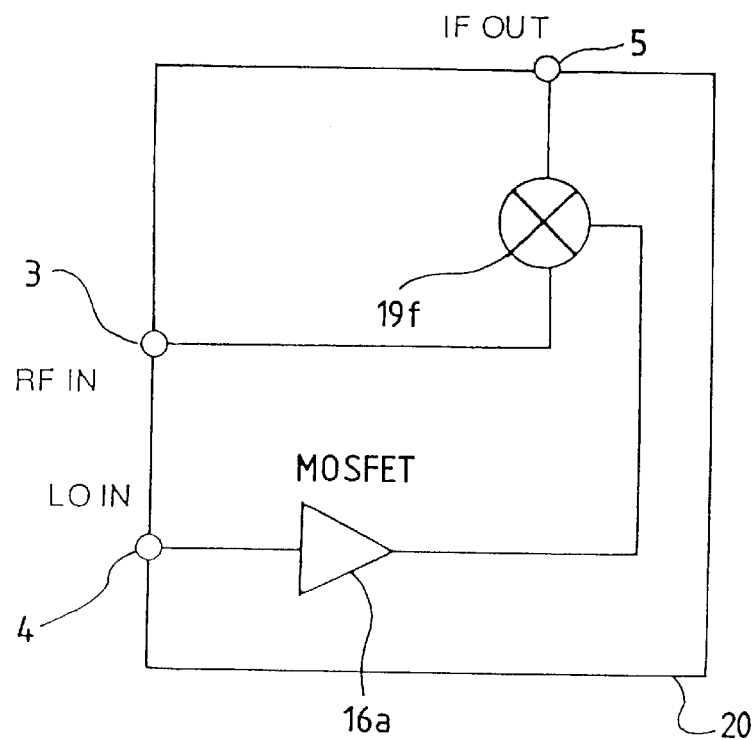
FIG. 13 is a block diagram showing the structure of an eighth embodiment of the RF circuit according to the present invention.

FIG. 13 is a block diagram showing the structure of an eighth embodiment of the RF circuit according to the present invention. Referring to the drawing, reference numeral 3 represents an input terminal (RF IN) for receiving an RF signal, 4 represents an input terminal (LO IN) for receiving a local signal, 5 represents an output terminal (IF OUT) for outputting an intermediate-frequency signal, 16*a* represents a MOSFET amplifier 16*a* having a MOSFET and 19*f* represents a mixer having a BJT. The RF is received by the input terminal (RF IN) 3 for receiving the RF signal, while the local signal is supplied through the input terminal (LO IN) 4 for receiving the local signal and the MOSFET amplifier 16*a*. Thus, an intermediate-frequency signal having a different frequency component between the RF signal and the local signal is generated so as to be output through the output terminal (IF OUT) 5 for outputting the intermediate-frequency signal.

Figure 14:
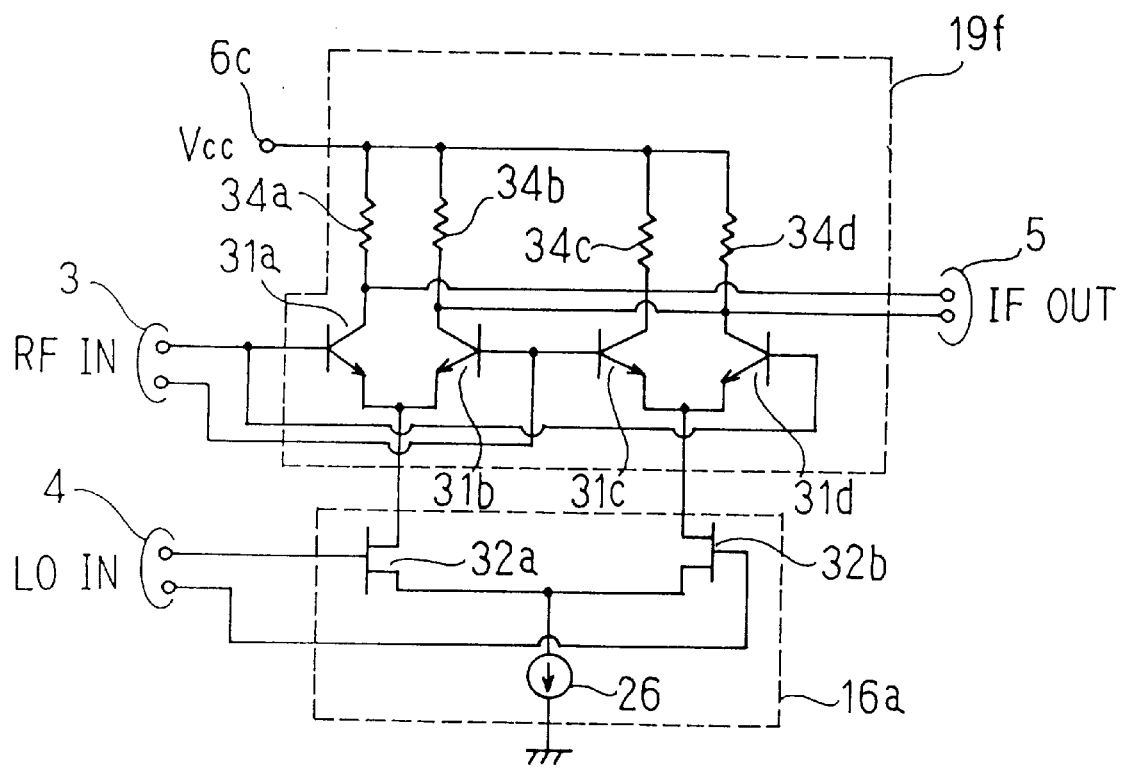
FIG. 14 is a block diagram showing an example of a detailed structure of a circuit in the RF circuit according to an eighth embodiment shown in FIG. 13.
Figure 15:
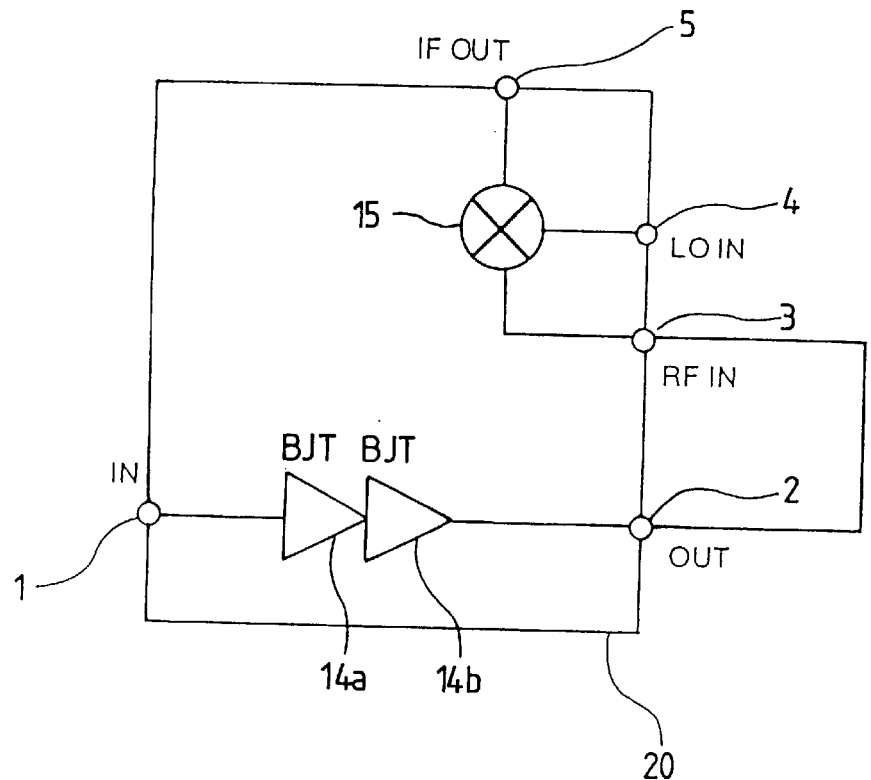
FIG. 15 is a block diagram showing the structure of a conventional RF circuit having multi-stage amplifiers and a mixer.
Figure 16:
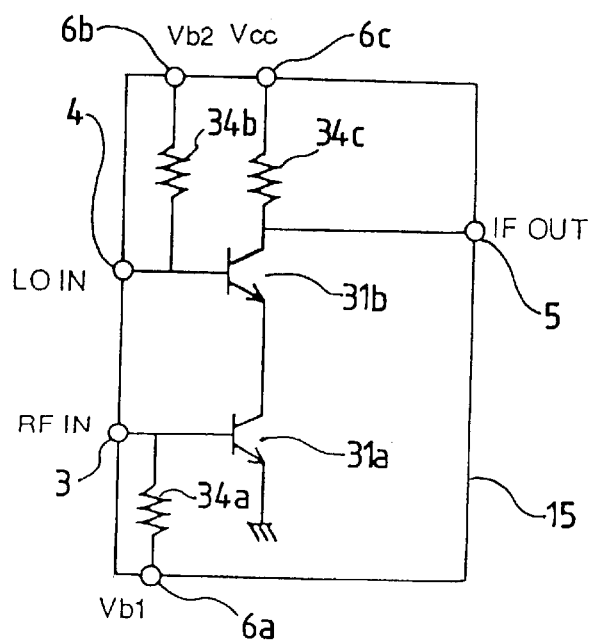
FIG. 16 is a circuit diagram showing the detailed structure of the mixer shown in FIG. 15.

FIG. 14 is a block diagram showing an example of the detailed structure of the RF circuit shown in FIG. 13 and according to the eighth embodiment. The RF circuit shown in FIG. 14 forms a so-called Gilbert mixer. Therefore, a pair of input terminals (RF IN) 3 for receiving the RF signal, that of the input terminals (LO IN) 4 for receiving the local signal and that of the output terminals (IF OUT) 5 for outputting the intermediate-frequency signal are provided to correspond to the differential signals.

As shown in FIG. 14, the MOSFET amplifier 16*a* is composed of a constant current source 26 and two MOSFETs 32*a* and 32*b* forming a differential amplifier. On the other hand, a mixer 19*f* is formed such that four pairs consisting of silicon BJTs 31*c* and 31*d* and resistors 34*a* to 34*d* are connected in parallel.

Therefore, the FET amplifier 16*a* having the MOSFETs 32*a* and 32*b* is employed as the local amplifier of the mixer 19*f* composed of the silicon BJTs 31*c* and 31*d* in the eighth embodiment. Therefore, a saturation level of the amplifier can be raised as compared with an RF circuit comprising the BJT as the local amplifier of the mixer 19*f* consisting of the silicon 31*c* and 31*d*. Moreover, a receiving system free from excessive noise even if amplification with large electric power is performed can be realized.

Since the FET amplifier 16*a* having the MOSFETs 32*a* and 32*b* is employed as the local amplifier of the mixer 19, the saturated electric power level can be raised and thus a larger local electric power can be supplied. As a result, low noise, large gain and small distortion characteristics can be obtained.

As described above, according to the present invention, there is provided an RF circuit comprising plural stage amplifiers, wherein at least a first amplifier is a BJT amplifier having a junction type bipolar transistor and at least a final amplifier is an FET amplifier having a field effect transistor. Therefore, if the foregoing RF circuit is employed as a low noise amplifier, use of the BJT amplifier which mainly affects the noise characteristic as the first amplifier enables a low noise characteristic to be obtained. Moreover, use of the MOSFET which mainly affects the distortion characteristic as the final amplifier enables a low noise characteristic to be obtained. As a result, a low noise amplifier having the low noise characteristic and the low distortion characteristic can be obtained.

Moreover, the BJT is the silicon BJT and the FET is the silicon MOS type FET which are integrated on the same silicon semiconductor chip by using the silicon biCMOS process or the BJT is the GaAs hetero junction BJT and the FET is the GaAs FET which are integrated on the same GaAs semiconductor chip so that the BJT amplifier and the FET amplifier are integrated on the same semiconductor chip. Therefore, the size of the circuit can be reduced.

According to the other aspect of the present invention, there is provided an RF circuit comprising a low-noise amplifier and a mixer monolithically integrated, on the same semiconductor chip by using a silicon BiCMOS process, wherein the low-noise amplifier has a silicon bipolar junction transistor and the mixer has a silicon MOS type field effect transistor. Therefore, if the RF circuit is employed as a receiving mixer, a receiving system exhibiting a low noise characteristic and a low distortion characteristic can be realized.

According to the other aspect of the present invention, there is provided a mixer composed of two FETs connected in series and fabricated such that a local signal is supplied to the gate of one of the FETs and a signal, the frequency of which is converted, is supplied to the gate of the other FET, wherein the width of the FET, to which the local signal is supplied, is reduced as compared with the width of the gate of the FET to which the signal, the frequency of which is converted, is supplied. Therefore, as compared with the structure in which the gates of the FETs are the same, the gain can be enlarged if the DC bias condition using the same electric current and voltage levels though the distortion characteristics are substantially the same. Therefore, the RF circuit can be operated with low local signal electric power.

In the other aspect of the present invention, the mixer is composed of the BJT and the FET connected in series and the local signal is supplied to the base of the BJT and the signal, the frequency of which is converted, is supplied to the gate of the FET. Therefore, a mixer having a low noise characteristic and a low distortion characteristic can be formed.

In the other aspect of the present invention, there is provided an RF circuit comprising a local amplifier and a mixer having a BJT such that the local amplifier and the mixer are formed on the same semiconductor chip by using a biCMOS process, wherein the local amplifier has a silicon MOSFET. Therefore, distortion of the local amplifier can be prevented. Moreover, noise generated from the mixer to which the local amplifier is connected can be reduced.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A radio frequency circuit comprising:
   a low-noise amplifier and a mixer monolithically integrated on a same semiconductor chip by using a silicon BiCMOS process, wherein
   said low-noise amplifier has a silicon bipolar junction transistor, and
   said mixer has a silicon MOS type field effect transistor.

2. The radio frequency circuit of claim 1, wherein
   said mixer includes two silicon MOS type field effect transistors one of which has a source connected to a drain of the other silicon MOS type field effect transistor, and wherein
   a gate of one silicon MOS type field effect transistors is supplied with a local signal, and
   a gate of the other silicon MOS type field effect transistor is supplied with a radio frequency signal amplified by said low-noise amplifier.

3. The radio frequency circuit of claim 1, wherein
   said mixer includes a silicon dual-gate MOS type field effect transistor, and wherein
   a local signal is supplied to one gate, and
   a radio frequency signal amplified by said low-noise amplifier is supplied to the other gate.

4. The radio frequency circuit of claim 1, wherein
   said low-noise amplifier, wherein
   at least a first amplifier is a BJT amplifier having a silicon bipolar junction transistor,
   at least a final amplifier is an FET amplifier having a silicon MOS type field effect transistor, and wherein
   said amplifiers are integrated on a same silicon semiconductor chip by using a silicon BiCMOS process.

5. A radio frequency circuit comprising:

a mixer including two field effect transistors connected in series, wherein
- a local signal is supplied to a gate of a first field effect transistor, and
- a signal, the frequency of which is converted, is supplied to a gate of a second field effect transistor, and wherein
  - the width of said gate of said first field effect transistor, to which the local signal is supplied, is reduced as compared with the width of said gate of said second field effect transistor to which the signal, the frequency of which is converted, is supplied.

6. A radio frequency circuit comprising:

a mixer including;
- a junction type bipolar transistor, and
- a field effect transistor connected in series, wherein
  - a local signal is supplied to a base of said junction type bipolar transistor, and
  - a signal, the frequency of which is converted, is supplied to a gate of said field effect transistor.

7. The radio frequency circuit of claim 5, wherein said junction type bipolar transistor is a silicon bipolar junction transistor, said field effect transistor is a silicon MOS type field effect transistor, and wherein
- said transistors are integrated on a same silicon semiconductor chip by using a silicon biCMOS process.

8. The radio frequency circuit of claim 6, wherein said junction type bipolar transistor is a silicon bipolar junction transistor, said field effect transistor is a silicon MOS type field effect transistor, and wherein
- said transistors are integrated on a same silicon semiconductor chip by using a silicon biCMOS process.

9. The radio frequency circuit of claim 7, further comprising:

a low-noise amplifier, wherein
- at least a first amplifier is a BJT amplifier having a silicon bipolar junction transistor,
- at least a final amplifier is an FET amplifier having a silicon MOS field effect transistor, and wherein
  - said low-noise amplifier, and said mixer are integrated on a same semiconductor chip by using a biCMOS process.

10. The radio frequency circuit of claim 8, further comprising:

a low-noise amplifier, wherein
- at least a first amplifier is a BJT amplifier having a silicon bipolar junction transistor,
- at least a final amplifier is an FET amplifier having a silicon MOS field effect transistor, and wherein
  - said low-noise amplifier, and said mixer are integrated on a same semiconductor chip by using a biCMOS process.

* * * * *